US008578072B2

(12) United States Patent
Dimatteo, III et al.

(10) Patent No.: US 8,578,072 B2
(45) Date of Patent: **\*Nov. 5, 2013**

(54) APPARATUS INCLUDING A PERIPHERAL INTERFACE PORT HUB AND SECURE THUMB DEVICE ENCLOSURE

(75) Inventors: Guido Nicholas Dimatteo, III, Ontario, NY (US); David Markham, Fairport, NY (US); Fred Wilczak, Jr., Pittsford, NY (US); David A. Mueller, Webster, NY (US); William McGuinness, Jr., Rochester, NY (US); Craig W. Martin, Henrietta, NY (US); Ronald O. Dews, Jr., Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 268 days.

This patent is subject to a terminal disclaimer.

(21) Appl. No.: 12/401,995

(22) Filed: Mar. 11, 2009

(65) Prior Publication Data

US 2010/0235547 A1 Sep. 16, 2010

(51) Int. Cl.
*G06F 3/00* (2006.01)
(52) U.S. Cl.
USPC .............................. 710/30; 340/572.9; 174/66
(58) Field of Classification Search
USPC .......................................................... 710/30
See application file for complete search history.

(56) References Cited

U.S. PATENT DOCUMENTS

| | | | | |
|---|---|---|---|---|
| 4,899,019 A * | 2/1990 | Riceman | | 174/67 |
| D421,962 S | 3/2000 | Varga | | |
| D425,866 S | 5/2000 | Nagasawa et al. | | |
| 6,137,409 A | 10/2000 | Stephens | | |
| 6,563,600 B1 | 5/2003 | Young | | |
| 6,590,597 B1 | 7/2003 | Kim | | |
| 6,722,917 B2 | 4/2004 | Huang | | |
| D516,074 S | 2/2006 | Ho et al. | | |
| 7,076,270 B2 | 7/2006 | Jaggers et al. | | |
| D530,717 S | 10/2006 | Mori et al. | | |
| 7,167,372 B2 * | 1/2007 | Mori et al. | | 361/731 |
| D537,036 S | 2/2007 | Chen | | |
| 7,255,582 B1 | 8/2007 | Liao | | |
| 7,275,941 B1 * | 10/2007 | Bushby | | 439/133 |
| 7,327,560 B1 | 2/2008 | Tabasso et al. | | |
| 7,401,481 B1 * | 7/2008 | Lin | | 70/14 |
| 7,617,342 B2 * | 11/2009 | Rofougaran | | 710/100 |
| 7,763,799 B2 * | 7/2010 | Johnson | | 174/67 |
| 2002/0182936 A1 * | 12/2002 | Fowler | | 439/652 |
| 2003/0141959 A1 * | 7/2003 | Keogh et al. | | 340/5.53 |
| 2004/0074264 A1 * | 4/2004 | Kung et al. | | 70/58 |
| 2007/0030517 A1 * | 2/2007 | Narayanan | | 358/1.15 |

(Continued)

*Primary Examiner* — Elias Mamo
(74) *Attorney, Agent, or Firm* — Ronald E. Prass, Jr.; Prass LLP

(57) ABSTRACT

An apparatus (100) having a peripheral interface port hub and secure thumb device enclosure is disclosed. The apparatus can include a frame (110) and an external peripheral interface upstream port (120) coupled to the frame. The external peripheral interface upstream port can be configured to couple the apparatus to a host external peripheral interface port, where the host external peripheral interface port can be configured to couple a host device to a peripheral external to the host device. The apparatus can include a plurality of external peripheral interface downstream ports (131-133) coupled to the frame, where each external peripheral interface downstream port can be configured to couple the apparatus to an external peripheral interface thumb device, where the external peripheral interface thumb device can be configured to be coupled to a printing apparatus. The apparatus can include a cover (150) configured to cover external peripheral interface thumb devices coupled to the plurality of external peripheral interface downstream ports.

16 Claims, 3 Drawing Sheets

(56) References Cited

U.S. PATENT DOCUMENTS

| | | |
|---|---|---|
| 2007/0055805 A1* | 3/2007 | Hayashi et al. ............... 710/306 |
| 2007/0074550 A1* | 4/2007 | Isaacs ......................... 70/279.1 |
| 2008/0005262 A1* | 1/2008 | Wurzburg et al. ............ 709/217 |
| 2008/0239681 A1* | 10/2008 | Iida .............................. 361/752 |
| 2010/0076616 A1* | 3/2010 | Kagan ........................... 700/295 |

* cited by examiner

APPARATUS INCLUDING A PERIPHERAL INTERFACE PORT HUB AND SECURE THUMB DEVICE ENCLOSURE

BACKGROUND

Disclosed herein is an apparatus including a peripheral interface port hub and secure thumb device enclosure.

Presently, external peripheral interface ports, such as universal serial bus ports, parallel ports, IEEE 1394 interface ports, and other external peripheral interface ports are used to connect external peripheral devices to printing apparatuses. Such printing apparatuses can include printers, digital front ends for printers, copiers, multifunction printing devices, print servers, and other printing apparatuses. The peripheral devices can include keyboards, computer mice, printers, external hard drives, thumb devices, and other peripheral devices that can be attached to an external peripheral interface port located on a printing apparatus. The thumb devices can include portable flash drives and dongles that include an integrated external peripheral interface port connector and that are typically small enough to be carried in a pocket of a user. A portable flash drive can be used to store and transfer data between computing devices. A dongle can be a hardware key, a hardware token, a security device, or any other portable external peripheral interface port device that can be used to authenticate a piece of software and/or enable capabilities of printing apparatuses. For example, a dongle can include a license key that can enable a target software application, can enable particular features in a target software application, and/or can allow access to features present in a target software application.

Unfortunately, thumb devices that are left attached to a printing apparatus while in use can be easily broken if users bump into the thumb devices. Furthermore, thumb devices can be easily stolen due to their removability and due to their small size. One possible solution to damage and theft is to remove a thumb device from a printing apparatus when the thumb device is not in use. However, removal of the thumb device creates additional problems aside from just the inconvenience of consistently removing the thumb device. One problem is that removing the thumb device leads to loss of the thumb device due to the small size of the device. Another problem is the wear on the thumb device due to repeated docking, undocking, and potential improper storage, which results in damage to the thumb device. A further problem is the fact that the thumb device cannot be removed while it is in use.

These problems become large issues in scenarios where thumb devices, such as dongles, are used to enable essential software features in industrial applications. For example, a dongle can be used to enable print features on a digital front end of a printing system. To allow the print system to continue operation, the dongle must be left in an external peripheral interface port on the digital front end while it is being used. If the dongle is stolen or broken, or if the dongle is removed and lost, immediate attention is required to replace the dongle to continue operation of the printing system. In some industries, hundreds of customer service requests are made each year for replacement dongles and each customer service request can cost the customer thousands of dollars just to replace a misplaced or damaged dongle. Such replacement costs do not even include the cost of days of lost production while awaiting the replacement dongle.

Other problems arise when a customer fraudulently alleges a dongle has been lost or stolen. In such an instance, a provider may provide a replacement dongle even though the customer still has the original operational dongle, which allows an unethical customer to violate terms of their licensing agreement by using dongles on more systems than originally agreed upon. This costs the provider lost profits due to the customer effectively stealing additional unlicensed software. This can also cause legal issues for the provider if the software is licensed from a third party developer and the provider is enabling the unethical customer to violate the agreement between all of the parties by providing the customer with additional unlicensed dongles.

Thus, there is a need for an apparatus having a peripheral interface port hub and secure thumb device enclosure.

SUMMARY

An apparatus having a peripheral interface port hub and secure thumb device enclosure is disclosed. The apparatus can include a frame and an external peripheral interface upstream port coupled to the frame. The external peripheral interface upstream port can be configured to couple the apparatus to a host external peripheral interface port, where the host external peripheral interface port can be configured to couple a host device to a peripheral external to the host device. The apparatus can include a plurality of external peripheral interface downstream ports coupled to the frame, where each external peripheral interface downstream port can be configured to couple the apparatus to an external peripheral interface thumb device, where the external peripheral interface thumb device can be configured to be coupled to a printing apparatus. The apparatus can include a cover configured to cover external peripheral interface thumb devices coupled to the plurality of external peripheral interface downstream ports.

BRIEF DESCRIPTION OF THE DRAWINGS

In order to describe the manner in which advantages and features of the disclosure can be obtained, a more particular description of the disclosure briefly described above will be rendered by reference to specific embodiments thereof which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which.

DETAILED DESCRIPTION

Figure 1:
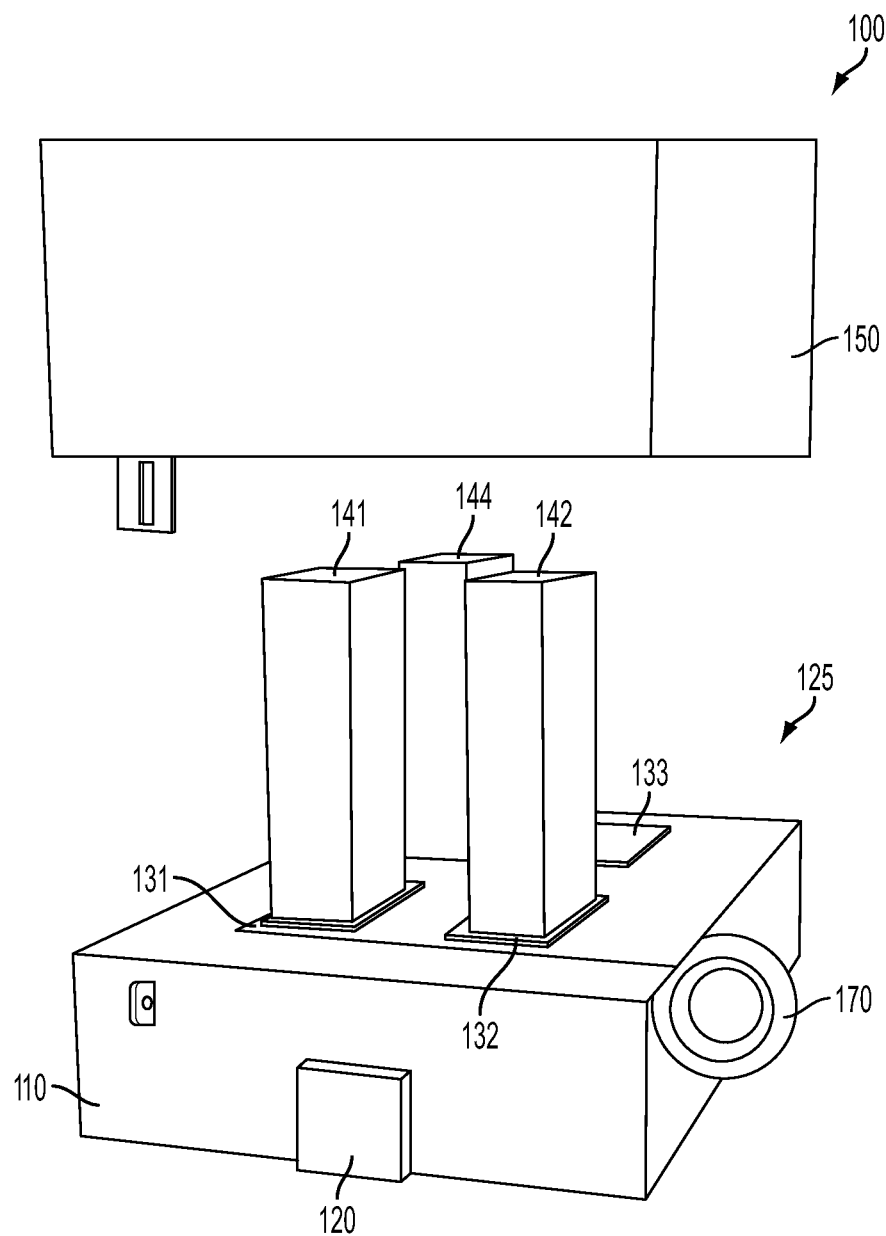
FIG. 1 is an exemplary illustration of an apparatus according to a possible embodiment.

The embodiments include an apparatus having a peripheral interface port hub and secure thumb device enclosure. The apparatus can include a frame and an external peripheral interface upstream port coupled to the frame. The external peripheral interface upstream port can be configured to couple the apparatus to a host external peripheral interface port, where the host external peripheral interface port can be configured to couple a host device to a peripheral external to the host device. The apparatus can include a plurality of external peripheral interface downstream ports coupled to the frame, where each external peripheral interface downstream port can be configured to couple the apparatus to an external peripheral interface thumb device, where the external peripheral interface thumb device can be configured to be coupled to a printing apparatus. The apparatus can include a cover configured to cover external peripheral interface thumb devices coupled to the plurality of external peripheral interface downstream ports.

The embodiments further include an apparatus having a universal serial bus hub and secure thumb device enclosure. The apparatus can include a lockable case configured to enclose a plurality of universal serial bus thumb devices and a universal serial bus hub coupled to the lockable case. The universal serial bus hub can include a universal serial bus upstream port configured to couple the apparatus to a host universal serial bus port. The universal serial bus hub can also include a plurality of universal serial bus downstream ports, where each universal serial bus downstream port can be configured to couple the universal serial bus hub to a universal serial bus thumb device, where the universal serial bus thumb device can be configured to be coupled to a printing apparatus.

The embodiments further include an apparatus having a universal serial bus hub and universal serial bus dongle enclosure. The apparatus can include a base and a universal serial bus upstream port coupled to the base. The universal serial bus upstream port can be configured to couple the apparatus to a host universal serial bus port, where the host universal serial bus port can be configured to couple a host device to a peripheral external to the host device. The apparatus can include a plurality of universal serial bus downstream ports coupled to the frame, each universal serial bus downstream port configured to couple the apparatus to a universal serial bus dongle. The apparatus can include at least one universal serial bus dongle coupled to one of the plurality of universal serial bus downstream ports, where the universal serial bus dongle can be configured to enable capabilities of the printing apparatus. The apparatus can include a cover lockable to the base, the cover configured to cover universal serial bus dongles coupled to the plurality of universal serial bus downstream ports. The apparatus can include a security ring configured to receive a security cable, the security ring configured to secure the apparatus to a stationary device.

FIG. 1 is an exemplary illustration of an apparatus 100 according to a possible embodiment. The apparatus 100 can include a frame 110 and an external peripheral interface upstream port 120 coupled to the frame. The external peripheral interface upstream port 120 can be configured to couple the apparatus 100 to a host external peripheral interface port (not shown), where the host external peripheral interface port can be configured to couple a host device to a peripheral external to the host device. The host external peripheral interface port can be a host external peripheral interface port on a print server.

The apparatus 100 can include a plurality of external peripheral interface downstream ports 131-133 coupled to the frame 110. Each external peripheral interface downstream port 131-133 can be configured to couple the apparatus 100 to an external peripheral interface thumb device 141, 142, and 144. The plurality of external peripheral interface downstream ports 131-133 can be oriented in a substantially similar direction so the external peripheral interface thumb devices 141, 142, and 144 are coupled to the plurality of external peripheral interface downstream ports 131-133 in a substantially similar orientation to each other. For example, all of the thumb devices 141, 142 and 144 can be oriented in a substantially vertical orientation relative to the frame 110.

An external peripheral interface port can be a universal serial bus port, a serial port, a parallel port, a PS/2 port, an IEEE 1394 interface port, an infrared wireless port, a Bluetooth wireless port, a radio frequency wireless port, a proximity badge reader wireless port, or any other external peripheral interface port that can couple a thumb device to a host. For example, the apparatus 100 can include a universal serial bus hub that can allow many universal serial bus devices to be connected to a single universal serial bus port on a host computer. Thus, the external peripheral interface upstream port 120 can be a universal serial bus upstream port and the external peripheral interface downstream ports 131-133 can be universal serial bus downstream ports. A universal serial bus port can use any version of universal serial bus protocol, such as 1.0, 2.0, and other universal serial bus protocols. An external peripheral interface thumb device can be a universal serial bus thumb device, a parallel port thumb device, a IEEE 1394 thumb device, or any other external peripheral interface thumb device. The term "external peripheral interface" thumb device describes the type of interface used with the thumb device and does not necessarily mean a thumb device is external to the apparatus 100.

An external peripheral interface thumb device is any portable artifact that interacts with a larger machine, which is installed with physical access to the machine and which can enable features, such as additional options, enhanced capabilities, higher speeds, and other features, of a larger machine. An external peripheral interface thumb device can be configured to be coupled to a printing apparatus. For example, an external peripheral interface thumb device can be a removable and rewritable flash memory data storage device. A removable and rewritable flash memory data storage device can include an integrated external peripheral interface. An external peripheral interface thumb device can also be a dongle configured to authenticate a piece of software and/or enable capabilities of a printing apparatus. For example a dongle can be a hardware key, a hardware token, a security device, or any other dongle. A dongle can include a license key that can enable a target software application, can enable particular features in a target software application, and/or can allow access to features present in a target software application. External peripheral interface thumb devices can also include wireless thumb devices, such as proximity badges, radio-frequency devices, and other wireless devices that are external to a larger machine and that can enable features of the larger machine.

The apparatus 100 can include a cover 150 configured to cover external peripheral interface thumb devices 141, 142, and 144 coupled to the plurality of external peripheral interface downstream ports 131-133. The cover 150 can be lockable to the frame 110 to secure external peripheral interface thumb devices 141, 142, and 144 within the cover 150. The cover can use a lock 160, such as an integrated lock, an external lock, a combination lock, a keyed lock, a fingerprint reader lock, a padlock, a retinal scanner lock, voice identification lock, or any other lock. The cover 150 can be detachable from the frame 110. The cover 150 can also be hinged, can be integrated with the frame 110, and/or can comprise more than one cover element. The cover 150 and the frame 110 can be a substantially impact-resistant and can be made of metal, plastic, wood, or other impact-resistant material that can protect thumb devices from impact and/or prevent tampering with the thumb devices.

The apparatus 100 can be configured to be secured to a stationary device. For example, the apparatus 100 can include a security ring 170 configured to receive a security cable, where the security ring 170 and/or cable can be configured to secure the apparatus 100 to a stationary device. For example, a security cable can be similar to a cable configured to be coupled to a laptop or can be any other security cable and can include a lock. As a further example, a security cable can be used to secure the apparatus 100 to a laptop and can also be used to secure the laptop to a stationary object to prevent theft of the laptop, the apparatus 100, and external peripheral interface thumb devices 141, 142, and 144 coupled to the apparatus 100.

According to a related embodiment, the apparatus 100 can include a lockable case configured to enclose a plurality of universal serial bus thumb devices 141, 142, and 144. The lockable case can include a base 110 and a cover 150 lockable to the base 110 to create a secure enclosure for the plurality of universal serial bus thumb devices 141, 142, and 144. A universal serial bus thumb device can be configured to be coupled to a printing apparatus. A universal serial bus thumb device can also be a dongle configured to authenticate a piece of software and/or enable capabilities of the printing apparatus. The apparatus 100 can be configured to be secured to a stationary device. For example, the apparatus 100 can include a security ring 170 configured to receive a security cable, where the security ring 170 and/or cable can be configured to secure the apparatus 100 to a stationary device.

The apparatus 100 can include a universal serial bus hub 125 coupled to the lockable case. The universal serial bus hub 125 can include a universal serial bus upstream port 120 configured to couple the apparatus 100 to a host universal serial bus port (not shown). The host universal serial bus port can be a host universal serial bus port on a print server. The universal serial bus hub 125 can include a plurality of universal serial bus downstream ports 131-133, where each universal serial bus downstream port 131-133 can be configured to couple the universal serial bus hub 125 to a universal serial bus thumb device 141, 142, and 144. The plurality of universal serial bus downstream ports 131-133 can be oriented in a substantially similar direction so the universal serial bus thumb devices 141, 142, and 144 are coupled to the plurality of universal serial bus downstream ports 131-133 in a substantially similar orientation to each other.

According to a related embodiment, the apparatus 100 can include a base 110 and a universal serial bus upstream port 120 coupled to the base 110. The universal serial bus upstream port 120 can be configured to couple the apparatus 100 to a host universal serial bus port (not shown), where the host universal serial bus port can be configured to couple a host device to a peripheral external to the host device. The apparatus 100 can include a plurality of universal serial bus downstream ports 131-133 coupled to the frame 110. Each universal serial bus downstream port 131-133 can be configured to couple the apparatus 100 to a universal serial bus dongle 141, 142, and 144. The apparatus 100 can include at least one universal serial bus dongle 141, 142, and/or 144 coupled to one of the plurality of universal serial bus downstream ports 131-133, where a universal serial bus dongle can be configured to enable capabilities of a printing apparatus. The apparatus 100 can include a cover 150 lockable to the base 110. The cover 150 can be configured to cover universal serial bus dongles 141, 142, and 144 coupled to the plurality of universal serial bus downstream ports 131-133. The apparatus 100 can include a security ring 170 configured to receive a security cable. The security ring 170 and/or cable can be configured to secure the apparatus 100 to a stationary device.

The plurality of universal serial bus downstream ports 131-133 can be oriented in a substantially similar direction so the universal serial bus dongles 141, 142, and 144 are coupled to the plurality of universal serial bus downstream ports 131-133 in a substantially similar orientation to each other. A universal serial bus dongle can be configured to authenticate a piece of software and/or enable capabilities of a printing apparatus.

Figure 2:
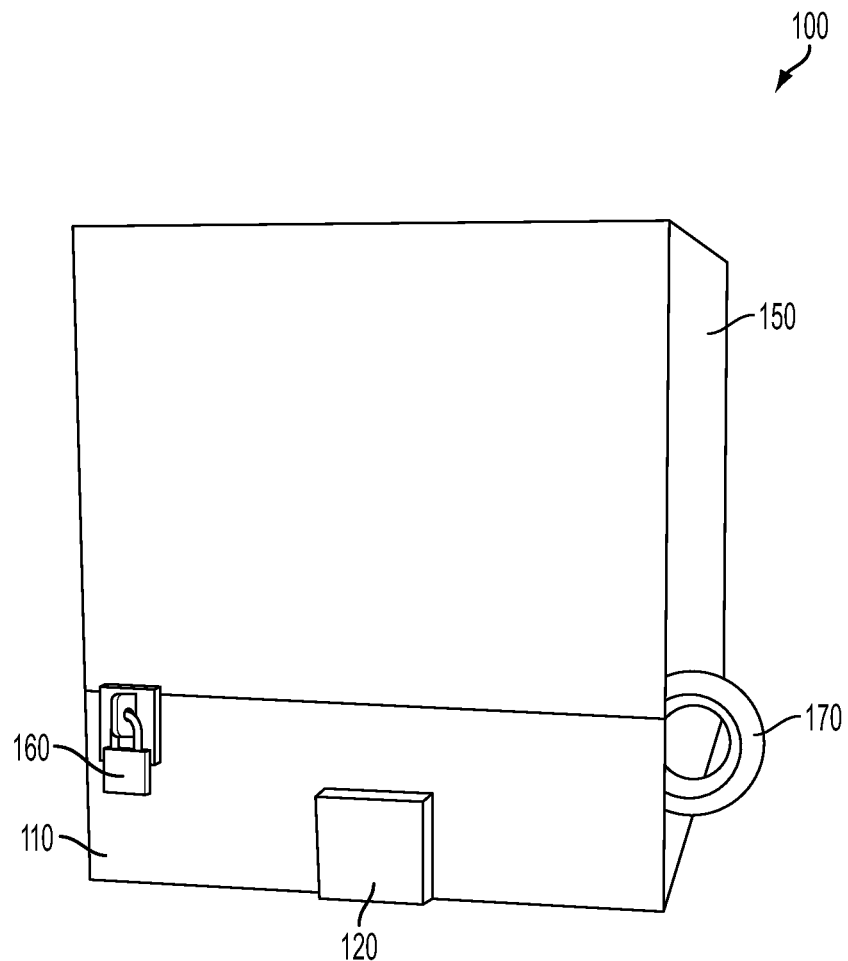
FIG. 2 is an exemplary illustration of an apparatus according to a possible embodiment.

FIG. 2 is an exemplary illustration of an apparatus 100 according to a possible embodiment. The cover 150 can cover external peripheral interface thumb devices, such as universal serial bus dongles, coupled to a plurality of universal serial bus downstream ports to lock and/or otherwise secure external peripheral interface thumb devices within the apparatus 100.

Figure 3:
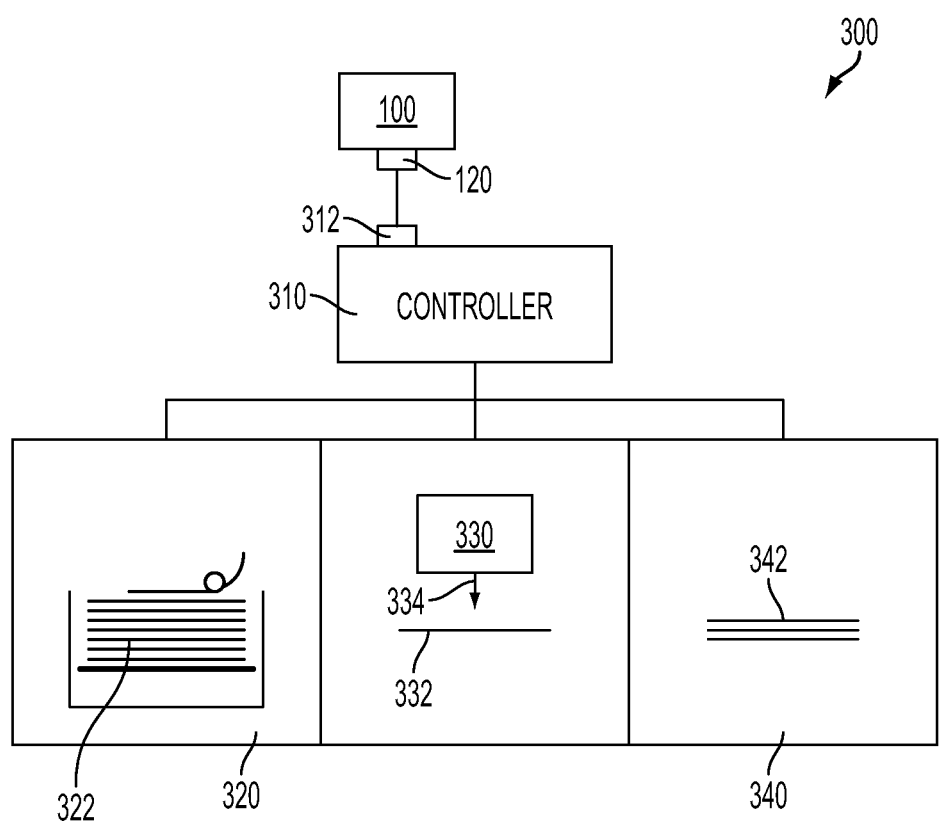
FIG. 3 is an exemplary illustration of a printing apparatus according to a possible embodiment.

FIG. 3 is an exemplary illustration of a printing apparatus 300 according to a possible embodiment. The printing apparatus 300 can be a laser printer, an ink jet printer, a digital front end for a printer, a copier, a multifunction printing device, a print server, or any other apparatus useful for printing. The printing apparatus 300 can include a source 320 of media sheets 322. The media sheets 322 can be paper, transparencies, labels, or any other media that can receive an image. The printing apparatus 300 can include a marking module 330 that can mark 334 an image on a media sheet 332 fed from the source 320. The printing apparatus 300 can include an output module 340 that can output media sheets 324 marked by the marking module 330. The printing apparatus 300 can include a controller 310 that can control the printing operations of the printing apparatus 300. The printing apparatus 300 can include the apparatus 100. The apparatus 100 can be secured to the printing apparatus 300 in a manner to prevent theft of the apparatus 100. The controller 310 can be wiredly or wirelessly coupled to the apparatus 100 via the external peripheral interface upstream port 120 and via an external peripheral interface port 312 on the controller 310. An external peripheral interface thumb device in the apparatus 100 can be configured to enable capabilities of the printing apparatus 300.

The embodiments can provide for a self-enclosed, lockable, and securable external peripheral interface port hub device that allows a user to plug the device into a personal computer external peripheral interface port and install multiple dongles and flash drives into a protective box that can provide simultaneous usage, storage, and protection for all required software option dongles. While one example illustrates a four external peripheral interface port thumb drive solution, the number of drives or dongles supported could be scaled up or down depending on need. The hub itself can be secured to any surface via a security ring, such as a lock loop, and a secure cable, such as one used for a laptop. The box cover can be locked to the hub base using any useful lock technology, such as an integrated tumbler or combination system, to prevent device theft.

Embodiments can provide for the reduction of thumb device breakage due to accidental bumping, can provide for the reduction the loss of thumb devices, can provide for the reduction of theft of thumb devices, and/or can provide for a single, permanent, and secure storage location for all desired thumb devices. For example, embodiments can reduce the possibility of broken dongles because the dongles can be housed in a protective covering that resists impacts. Embodiments can reduce the number of lost dongles because the dongles can be housed in a central location that can be semi-permanently attached to their corresponding devices. Embodiments can reduce the number of stolen dongles because the dongles can be housed in a lockable box that can be secured to the physical location of the requisite device.

Embodiments can provide for an external peripheral interface port hub base that has all flash drive ports facing upwards so that when installed, all external peripheral interface port flash drives can be vertical or perpendicular in relation to the external peripheral interface ports. This can allow for the installation of multiple drives in a smaller footprint and can lend to scalability of some embodiments. The hub base can have a removable box that sits on top of it, which can enclose the installed flash drives into an impact resistant enclosure and can provide for protection of the drives housed within. The housing can be made up of a high strength material to provide maximum protection against breakage. The hub box can be locked to the hub base via a lock, such as one using internal tumblers, a padlock assembly, or other lock technology to prevent theft, and the hub base can be secured to a work surface via an integrated eye and a secure cable to prevent device theft.

Thus, embodiments can provide for an integrated lockable external peripheral interface port hub enclosure, for a physically securable external peripheral interface port hub, and/or for physically securable external peripheral interface port flash drives and dongles. Embodiments can protect multiple external peripheral interface port flash drives and dongles from theft, can protect multiple external peripheral interface port flash drives and dongles from accidental loss, can protects multiple external peripheral interface port flash drives and dongles from accidental damage, and can provide a single point of storage for multiple drives and dongles while simultaneously allowing live use of the drives and dongles. Embodiments can enable dongles and flash drives to be semi-permanently attached without requiring their removal from an external peripheral interface port to avoid theft, loss, or breakage of the dongles and flash drives. Embodiments can be used with any universal serial bus or other external peripheral interface dongle that can be used for software option enablement or with any other external peripheral interface thumb device, such as a flash drive.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the embodiments. For example, one of ordinary skill in the art of the embodiments would be enabled to make and use the teachings of the disclosure by simply employing the elements of the independent claims. Accordingly, the preferred embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. Also, relational terms, such as "top," "bottom," "front," "back," "horizontal," "vertical," and the like may be used solely to distinguish a spatial orientation of elements relative to each other and without necessarily implying a spatial orientation relative to any other physical coordinate system. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

We claim:

1. An apparatus comprising:
a frame;
an external peripheral interface upstream port coupled to the frame, the external peripheral interface upstream port configured to couple the apparatus to a host external peripheral interface port, the host external peripheral interface port being configured to couple a host device to a peripheral device external to the host device;
a plurality of external peripheral interface downstream ports coupled to the frame, each of the external peripheral interface downstream ports being configured to couple the apparatus to an external peripheral interface thumb device, the external peripheral interface thumb device being configured to be coupled to a printing apparatus;
a cover configured to cover external peripheral interface thumb devices coupled to the plurality of external peripheral interface downstream ports; and
a locking device that locks the cover to the frame, the locking device being one of an integrated security lock, an a fingerprint reader lock, a retinal scanner lock or a voice identification lock,
wherein the external peripheral interface thumb devices comprise at least one dongle configured to enable capabilities of the printing apparatus.

2. The apparatus according to claim 1, wherein the cover is detachable from the frame.

3. The apparatus according to claim 1, wherein the plurality of external peripheral interface downstream ports are oriented in a substantially same direction so the external peripheral interface thumb devices are coupled to the plurality of external peripheral interface downstream ports in a substantially similar orientation to each other.

4. The apparatus according to claim 1, wherein the apparatus is configured to be secured to a stationary device.

5. The apparatus according to claim 1, further comprising a security ring configured to receive a security cable, the security ring being configured to secure the apparatus to a stationary device.

6. The apparatus according to claim 1, wherein the external peripheral interface thumb devices comprise at least one removable and rewritable flash memory data storage device.

7. The apparatus according to claim 1, wherein the host external peripheral interface port comprises a host external peripheral interface port on a print server.

8. The apparatus according to claim 1, wherein the external peripheral interface upstream port comprises a universal serial bus upstream port and the plurality of external peripheral interface downstream ports comprise universal serial bus downstream ports.

9. An apparatus comprising:
a locking case configured to enclose a plurality of universal serial bus thumb devices, the locking case including:
a base;
a cover that locks to the base to create a secure enclosure for the plurality of universal serial bus thumb devices; and
a locking device that locks the cover to the base, the locking device being one of an integrated security lock, an a fingerprint reader lock, a retinal scanner lock or a voice identification lock; and
a universal serial bus hub coupled to the locking case, the universal serial bus hub including:
a universal serial bus upstream port configured to couple the apparatus to a host universal serial bus port; and a plurality of universal serial bus downstream ports, each of the universal serial bus downstream ports being configured to couple the universal serial bus hub to one of the plurality of universal serial bus thumb devices, the plurality of universal serial bus thumb devices being configured to be coupled to a printing apparatus, wherein the plurality of universal serial bus thumb devices comprise at least one dongle configured to enable capabilities of the printing apparatus.

10. The apparatus according to claim 9, wherein the plurality of universal serial bus downstream ports are oriented in a substantially same direction so that the plurality of universal serial bus thumb devices are coupled to the plurality of universal serial bus downstream ports in a substantially similar orientation to each other.

11. The apparatus according to claim 9, wherein the apparatus is configured to be secured to a stationary device.

12. The apparatus according to claim 9, further comprising a security ring configured to receive a security cable, the security ring being configured to secure the apparatus to a stationary device.

13. The apparatus according to claim 9, wherein the host universal serial bus port comprises a host universal serial bus port on a print server.

14. An apparatus comprising:
a base;
a universal serial bus upstream port coupled to the base, the universal serial bus upstream port configured to couple the apparatus to a host universal serial bus port, the host universal serial bus port being configured to couple a host device to a peripheral device external to the host device;
a plurality of universal serial bus downstream ports coupled to the frame, each of the universal serial bus downstream ports being configured to couple the apparatus to a universal serial bus dongle;
at least one universal serial bus dongle coupled to one of the plurality of universal serial bus downstream ports, the at least one universal serial bus dongle being configured to enable capabilities of a printing apparatus;
a cover that locks to the base, the cover being configured to cover the at least one universal serial bus dongle coupled to one of the plurality of universal serial bus downstream ports;
a locking device that locks the cover to the base, the locking device being one of an integrated security lock, a fingerprint reader lock, a retinal scanner lock or a voice identification lock; and
a security ring configured to receive a security cable, the security ring being configured to secure the apparatus to a stationary device.

15. The apparatus according to claim 14, wherein the plurality of universal serial bus downstream ports are oriented in a substantially same direction so that a plurality of universal serial bus dongles are coupled to the plurality of universal serial bus downstream ports in a substantially similar orientation to each other.

16. The apparatus according to claim 14, further comprising a printing apparatus coupled to the universal serial bus upstream port.

* * * * *